US007742321B2

(12) United States Patent
Komulainen et al.

(10) Patent No.: US 7,742,321 B2
(45) Date of Patent: Jun. 22, 2010

(54) MEASUREMENT OF THE CURRENT OF A FREQUENCY CONVERTER

(75) Inventors: Risto Komulainen, Klaukkala (FI); Hannu Saren, Vaasa (FI); Jaakko Ollila, Pirkkala (FI)

(73) Assignee: Vacon OYJ, Vaasa (FI)

( * ) Notice: Subject to any disclaimer, the term of this patent is extended or adjusted under 35 U.S.C. 154(b) by 291 days.

(21) Appl. No.: 11/806,637

(22) Filed: Jun. 1, 2007

(65) Prior Publication Data

US 2007/0279958 A1 Dec. 6, 2007

(30) Foreign Application Priority Data

Jun. 1, 2006 (FI) .................................. 20060537

(51) Int. Cl.
*H02M 5/458* (2006.01)

(52) U.S. Cl. .......................................... 363/37; 363/97

(58) Field of Classification Search ................... 363/37, 363/41, 97, 132, 137; 318/809, 811
See application file for complete search history.

(56) References Cited

U.S. PATENT DOCUMENTS 4,520,298 A * 5/1985 Abbondanti ................ 318/490
5,367,240 A * 11/1994 Schroder-Brumloop et al. .. 318/727
6,049,474 A * 4/2000 Platnic ........................ 363/98

FOREIGN PATENT DOCUMENTS

FI 116337 B 6/2005

OTHER PUBLICATIONS

"Calculate." Random House Unabridged Dictionary. (C) 1997 by Random House, Inc., on Infoplease. (C) 2000-2009 Pearson Education, publishing as Infoplease. Accessed Oct. 27, 2009 <http://dictionary.infoplease.com/calculate>.*

IEEE, Transactions on Industry Applications, vol. 33, No./ 5, Sep./ Oct. 1997; Frede Blaabjert et al.; "Single Current Sensor Technique in the DC Link of Three-Phase-VS Inverters: A Review and a Novel Solution".

The European Power Electronics Association. 1993, pp. 415-421, J.F. Moynihan, et al., "Single Sensor Current Control of AC Servodrives Using Digital Signal Processors".

University of L'Aquila Department of Electrical Engineering. pp. 1284-1289, Francesco Parasiliti, et al., "Low Cost Phase Current Sensing in DSP Based AC Drives".

IEEE Transations on Power Electronics, vol. 17, No. 6, Nov. 2002, Dong-Choon Lee, et al., "AC Voltage and Current Sensorless Control of Three-Phase PWM Rectifiers".

IEEE 1999 International Conference on Power Electronics and Drive Systems, REDS'99, Jul. 1999, Hong Kong, B. Anderson et al., "Active Three-phase Rectifier with only One Current Sensor in the dc-link".

* cited by examiner

*Primary Examiner*—Jeffrey L Sterrett
*Assistant Examiner*—Fred E Finch, III
(74) *Attorney, Agent, or Firm*—Birch, Stewart, Kolasch & Birch, LLP

(57) ABSTRACT

A method and an apparatus for measuring the output currents of a frequency converter, preferably a vector-controlled frequency converter, which comprises a mains bridge (10) connectable to an alternating-current network and a load bridge (11) connectable to an alternating-current load and between these a direct-voltage intermediate circuit, by using current samples obtained from a current measuring sensor in the intermediate voltage circuit, wherein a sample is taken from the signal of the current measuring sensor substantially simultaneously with a point of change of the output voltage vector and upon the lapse of a predetermined delay after the point of change after the switching effects have settled.

20 Claims, 2 Drawing Sheets

MEASUREMENT OF THE CURRENT OF A FREQUENCY CONVERTER

BRANCH OF TECHNOLOGY

The present invention relates to a method and apparatus for measuring the current of a frequency converter. In particular, the invention relates to a method and apparatus for measuring the output currents of a vector-controlled frequency converter comprising a mains bridge connectable to an alternating-current network and a load bridge connectable to an electric load and between these a direct-voltage intermediate circuit, by using a current measuring element provided in the intermediate voltage circuit.

PRIOR ART

Conventionally, in frequency converters expected to provide a reasonably good motor control performance, the output currents have been measured using either two or three current converters. For the control, samples of the currents are generally taken at the middle of the zero vector of the output voltage, where the harmonics content of the measurement signal is at a minimum. This measuring method has the disadvantage of being expensive as it requires several, even as many as three converters.

Patent specification FI 116337 discloses an apparatus for measuring the currents of a frequency converter, using a current sensor placed in the direct-voltage intermediate circuit to generate signals corresponding to the current in the dc circuit of the frequency converter and a measuring unit wherein the current values of the direct-voltage intermediate circuit of the frequency converter are converted into corresponding signals. The measuring unit is additionally provided with a memory for storing the actual and previous signal values and a differential element for producing a current value corresponding to each output phase current as the difference between successive signals. However, this method involves the limitation relating to the formation of output voltage that during one modulation cycle only two switch pairs are modulated.

BRIEF DESCRIPTION OF THE INVENTION

The object of the present invention is to create a new type of measuring arrangement for measurement of the current of a frequency converter that will produce very accurate information about the instantaneous values of the output currents by using only one advantageous current sensor and without the limitations associated with modulation techniques. Accurate current information is needed at least in so-called vector-controlled devices.

According to the invention, the current is measured by means of one sensor disposed in the intermediate circuit. The sensor may be e.g. a parallel or shunt resistor or a converter based on the Hall effect.

The current flowing through the sensor in the direct-voltage intermediate circuit provides a sample of the current in that output phase which is in a different position than the other two switches. Based on this, and taking into account that the rate of change of the motor current can be estimated relatively accurately within the duration of each output voltage vector, the instantaneous value of the current at a desired instant of time can be calculated. In this way, about the same situation is reached as by the conventional system based on three current sensors wherein the currents are sampled twice during the modulation cycle, at the beginning and middle of the zero vector.

The details of the features characteristic of the solution of the invention are disclosed in the attached claims.

BRIEF DESCRIPTION OF THE FIGURES

In the following, the invention will be described in more detail by referring to an example and the attached drawings, wherein.

DETAILED DESCRIPTION OF THE INVENTION

Figure 1:
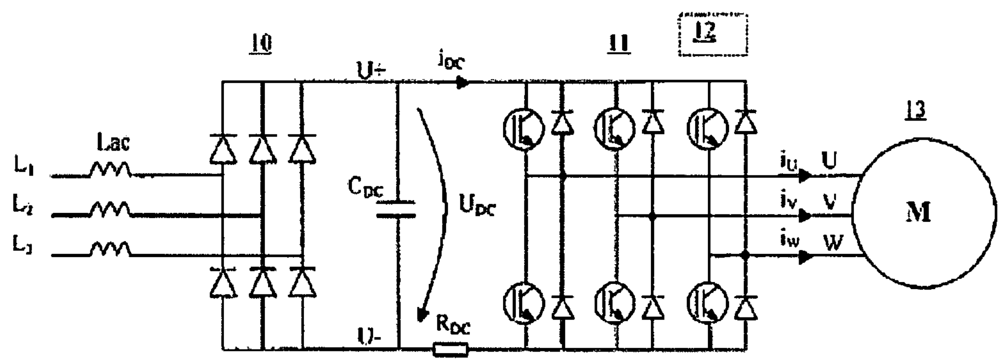
FIG. 1 represents the main circuit of a frequency converter.
Figure 3:
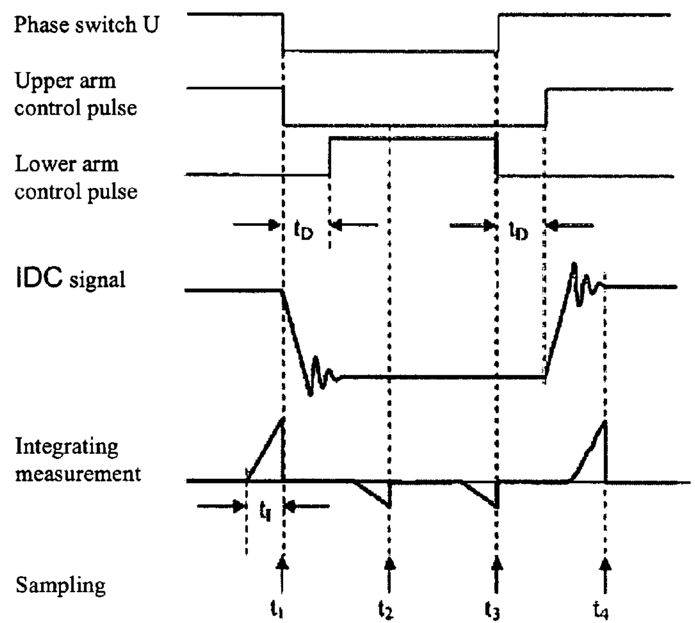
FIG. 3 represents a change of state of a phase switch, the intermediate circuit current and sampling of the current.

FIG. 1 represents a normal main circuit of a three-phase PWM frequency converter having a mains bridge 10 consisting of diodes for rectifying the three-phase alternating current of the supply network into a direct voltage for the DC intermediate circuit, a filter capacitor $C_{DC}$, a load bridge 11 consisting of three phase switches implemented using power semiconductors, which produces from the intermediate-circuit direct voltage $U_{DC}$ a three-phase output voltage $U_u$, Uv, $U_W$ to an induction motor 13, and a control unit 12. The phase switch consists of power semiconductor switches, preferably IGBTs, in the upper and lower arms, and diodes connected in parallel with them. The phase switch connects the output phase either to the $+U_{DC}$ (high position) rail or to $-U_{DC}$ (low position) rail. The turning of the switch e.g. from the high position to the low position is carried out as illustrated in FIG. 3 by first terminating the control pulse for the previously conducting upper-arm IGBT and then, upon the lapse of a so-called dead time, starting the control pulse for the lower-arm IGBT. The control pulses are generated in a so-called modulator in the control unit. The measurement of current according to the present invention is implemented using one current sensor RDC, which may be placed either in the $-U_{DC}$ arm as shown in the figure or alternatively in the $+U_{DC}$ arm.

Figure 2:
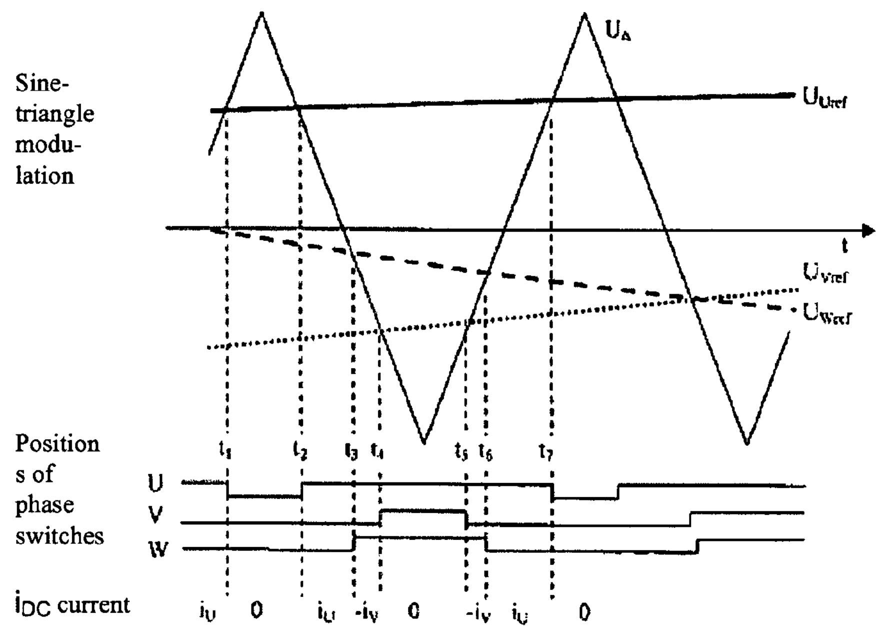
FIG. 2 represents sine-triangle modulation and the output currents in the intermediate circuit.

FIG. 2 represents the principle of implementation of sine-triangle modulation and the generation of an intermediate-circuit current signal. In sine-triangle modulation, there is for each phase voltage a separate sinusoidal reference signal ($U_{Uref}$, $U_{Vref}$, $U_{Wref}$), which are compared to a common triangular signal $U_\Delta$. As a result of this comparison, according to FIG. 2, three phase-switch position references U, V and W are obtained, wherein the "1" position means that in the main circuit the controllable power semiconductor switch in the upper arm is conducting while in the "0" position the switch in the lower arm is conducting. The figure also shows the output current data seen by the current sensor placed in the intermediate circuit; for example, during the time span $t_1$-$t_2$, when all the phase switches are in the low position, the intermediate circuit current is 0. Correspondingly, e.g. during the time span $t_2$-$t_3$, when the U-phase switch is in the high position and the other phase switches are in the low position, the intermediate circuit current is the same as the current $i_U$ in the U-phase. Table 1 shows the interdependencies between all the various switch positions and the phase currents visible in the $i_{DC}$ signal, on the basis of which interdependencies the output currents are reconstructed (the positive direction of the currents is defined as the direction towards the motor):

TABLE 1

| U | V | W | $i_{DC}$ |
|---|---|---|---|
| 0 | 0 | 0 | 0 |
| 1 | 0 | 0 | $i_U$ |
| 0 | 1 | 0 | $i_V$ |
| 0 | 0 | 1 | $i_W$ |
| 1 | 1 | 0 | $-i_W$ |
| 0 | 1 | 1 | $-i_U$ |
| 1 | 0 | 1 | $-i_V$ |
| 1 | 1 | 1 | 0 |

The reconstruction of the output currents from the current sensor signal is based on the general nature of the three-phase system (the sum of the output currents is 0) and on the properties of the modulator based on sine-triangle comparison. According to the present invention, a sample of the current in the direct-voltage intermediate circuit (the $i_{DC}$ current) is taken in conjunction with the changes of state of the phase switches in the manner visualized in FIG. 3. The figure shows a typical power switch control sequence, wherein e.g. at a change of the reference for phase switch position from high to low the control pulse for the previously conducting upper-arm IGBT is first terminated and, upon the lapse of a so-called dead time $t_D$ (e.g. 2 μs), the control pulse for the lower arm is started.

Each change of state of the phase switch produces a change in the intermediate circuit current. According to the invention, a sample of the first phase current is obtained at the same instant when the gate control pulse to the conducting IGBT is terminated, for example at instants of time $t_1$ and $t_3$ in FIG. 3. Similarly, a sample of the second phase current is obtained after a suitable delay after the onset of the control pulse to the IGBT being turned on, at instants of time $t_2$ and $t_4$ in the example in the figure. The delay ($t_2$-$t_1$ and $t_4$-$t_3$ in FIG. 3) is preferably long enough to allow the oscillatory effects after the firing of the IGBT to settle, e.g. 5 μs.

The magnitude and duration of the oscillations adverse to sampling depend on circumstances including the motor cable capacitance, which again depends on the length of the cable. The random error that the oscillations may cause in the sampling can be eliminated by using an integrating sampling principle as illustrated in FIG. 3. In the method, the time integral of the signal to be measured within a given measuring period, e.g. 3 μs, is produced and a sample is taken at the end of the period.

By the above-described sampling principles, practically simultaneous samples, considering the rate of change of the output currents, of two phase currents are obtained twice during the switching cycle, on the basis of which the instantaneous value of even the third phase current can be calculated (e.g. at instants of time $t_3$ and $t_6$ in FIG. 2, samples of currents $i_U$ and $-i_V$ are measured, from which the third current $i_W=i_U-i_V$ can be calculated).

On the basis of the samples, the result of measurement of the rate of change of the phase current can also be determined (for example, for current $i_U$, the di/dt for the time interval $t_2 \ldots t_3$ can be calculated directly from the current samples obtained at these instants). The rate of change of the other phase currents can be calculated with a sufficient accuracy by the principle visualized in FIG. 4. For the sake of simplicity, the figure represents a situation in the case of a full output current, a so-called "six step" voltage profile. The figure shows:

positions/potentials of the phase switches U, V and W potential 0 of the virtual star point of the motor (average of the previous values)

voltage profile U-0 of phase voltage U (phase switch-star point)

sinusoidal graph U1 of the counter EMF of the motor, which can either be calculated on the basis of the motor model or alternatively the fundamental wave of phase voltage U (which is proportional to the sine wave used in the sine-triangle modulator) can be used as its approximate value. In the short period of time required for the estimation of the current, the error resulting from this simplification is insignificant.

voltage profile between phase voltage U and the counter EMF U1, which is proportional to the rate of change $di_U/dt$ of the phase current because the change in current is primarily limited by the distributed inductance of the stator the rates of change $di_V/dt$ and $di_W/dt$ of the other phase currents, calculated in a corresponding manner.

Since the sum of the changes in the phase currents equals 0 and the mutual magnitudes of their rates of change can be calculated as described above, the current changes in the other phases too for the same time span can be calculated on the basis of one measured phase current change. Thus, it is possible to reconstruct the instantaneous value of each phase current beforehand or afterwards at each nearest point of change of the output voltage vector (instants of time $t_1$, $t_2, \ldots t_7$ and so on in FIG. 2) or at any desired instant of time.

The conventional point of time for the measurement of current which has been found to be expedient is at the midpoint of the zero vector (at the apex of the triangle, such as e.g. at about midway between instants of time $t_4 \ldots t_5$). The same result is achieved by the method of the present invention (in this case by calculating the mean value of the currents measured and calculated at instants of time $t_4$ and $t_5$).

Figure 1A:
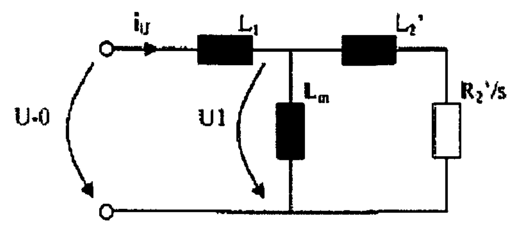
FIG. 1*a* represents the equivalent circuit for a 3-phase squirrel-cage induction motor
Figure 4:
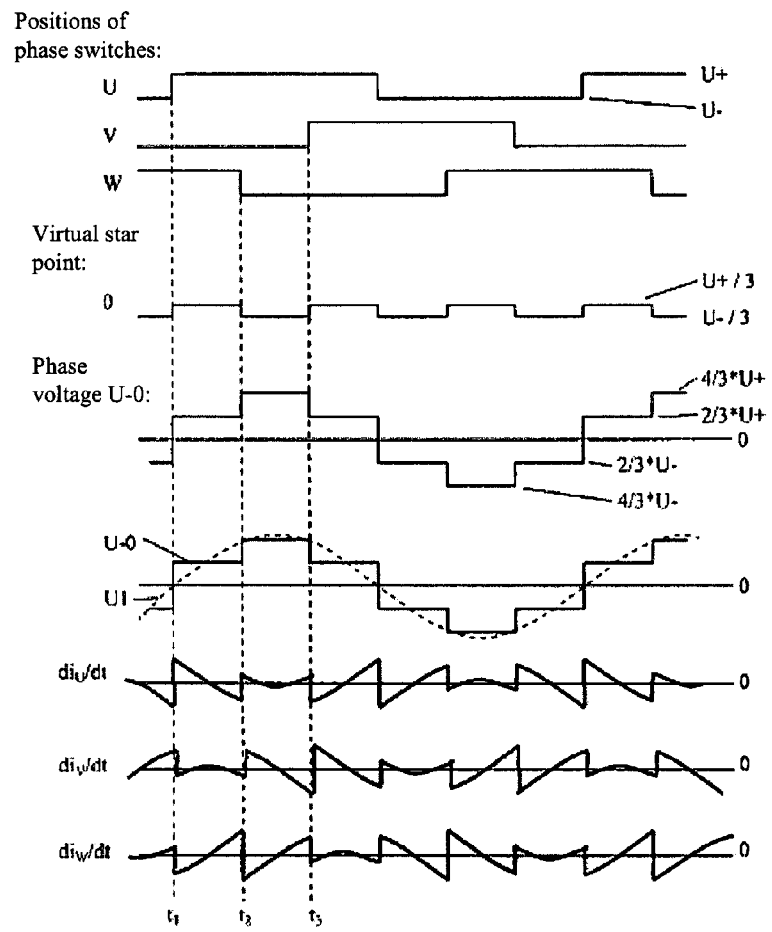
FIG. 4 represents the rates of change of the motor currents during the on-time of the active vectors.

In the following, the principle of calculation of the rate of change of the output current is explained in more detail:

1. The description is based on the symbols used in FIG. 1, in which the frequency converter is presented using the following symbols:
   The direct voltage of the intermediate circuit is $U_{DC}$, having the poles U+ and U−
   Output voltages U, V and W, the potential of which is either U+ or U− according to the control, i.e. modulation of the power switches of the inverter (load bridge 11)
2. A simplified 1-phase equivalent circuit (leaving out components inessential to the formation of motor current) for a 3-phase squirrel-cage induction motor, such as is normally controlled by a frequency converter, is as illustrated in FIG. 1*a*. Symbols used in the figure:
   U-0=phase voltage supplying the motor
   U1=counter EMF (electromotive force) of the motor
   $L_1$=distributed reactance of the stator
   $L_m$=excitation reactance
   $L_2'$=distributed reactance of the rotor
   $R_2'/s$=resistance of the rotor circuit
3. Based on FIG. 1*a*, it is obvious that the rate of change of the stator current can be calculated when the supplying phase voltage, the counter EMF and the distributed reactance of the stator are known: $di/dt=([U-0]-U1)/L_1$
4. FIG. 4 visualizes how the data required for the determination of the rate of current change can be deduced in the case of a motor supplied by a PWM frequency converter:

According to the positions of the phase switches, the instantaneous values of the output currents vary between U+ and U−

The potential (0) at the virtual star point is the same as the average of the output voltages; thus, in the case of the figure, it varies between U+/3 and U−/3.

According to the modulation method normally used, often all the output voltages are also in the same position, e.g. connected to U+, in which situation the star point potential, too, is at this same potential.

The phase voltage supplying the motor, e.g. U-0 as shown in the figure, is the difference between the output voltage in question and the voltage at the virtual star point, varying between 4/3*U+ and 4/3*U− in the case of the figure. When all the phase switches are in the same position, then all the phase voltages are also 0, as can be inferred from the above description.

The counter EMF, e.g. U1 shown in the figure in the case of phase voltage U, is obtained as explained above, Depicted in the lower part of the figure are the graphs for the differences between the phase voltages and counter EMFs, which can be calculated for each phase on the principles described above, in a simplified case where the phase switches are never in the same position. In a situation where the phase switches are in the same position, the difference between the voltages in question is naturally equal to the instantaneous value of the counter EMF.

It is obvious to a person skilled in the art that different embodiments of the invention are not exclusively limited to the example described above, but that they may be varied within the scope of the claims presented below.

The invention claimed is:

1. A method of measuring the output currents of a vector-controlled frequency converter comprising a mains bridge connectable to an alternating-current network and a load bridge connectable to an alternating-current load and between these a direct-voltage intermediate circuit, by using current samples obtained from a current measuring sensor disposed in the intermediate voltage circuit, wherein a sample is taken from a signal of the current measuring sensor substantially simultaneously with a point of change of an output voltage vector and upon the lapse of a predetermined delay after the point of change after switching effects have settled.

2. The method according to claim 1, wherein a time integral is formed from the signal of the current measuring sensor before the sampling.

3. The method according to claim 2, wherein, based on measured samples and the time between instants of change of the vectors, the rate of change (di/dt) of the output current is calculated.

4. The method according to claim 2, wherein, based on a measured rate of change of current, the values of all output currents are calculated at a desired instant of time.

5. The method according to claim 2, wherein the value of output currents is estimated on the basis of instantaneous values at the midway point of a zero vector.

6. The method according to claim 1, wherein, based on the measured samples and the time between the instants of change of the vectors, the rate of change (di/dt) of output current is calculated.

7. The method according to claim 6, wherein, based on a measured rate of change of current, the values of all output currents are calculated at a desired instant of time.

8. The method according to claim 6, wherein the value of output currents is estimated on the basis of the instantaneous values of the output currents at the midway point of a zero vector.

9. The method according to claim 1, wherein, based on a measured rate of change of the current, values of all the output currents are calculated at a desired instant of time.

10. The method according to claim 9, wherein the value of the output currents is estimated on the basis of instantaneous values of the output currents at the midway point of a zero vector.

11. Method according to claim 1, wherein the value of the output currents is estimated on the basis of the instantaneous values at the midway point of a zero vector.

12. An apparatus for measuring the output currents of a frequency converter, preferably a vector-controlled frequency converter comprising a mains bridge connectable to an alternating-current network and a load bridge connectable to an alternating-current load and between these a direct-voltage intermediate circuit, said apparatus comprising a current measuring sensor in the intermediate voltage circuit and a control system for determining output currents by using current samples obtained from the current measuring sensor, and for taking a sample from a signal of the current measuring sensor just before each point of change of an output voltage vector and after each point of change after switching effects have settled.

13. Apparatus according to claim 12, wherein the control system produces from a current measuring sensor signal a time integral before taking a sample.

14. The apparatus according to claim 13, wherein the control system calculates the rate of change (di/dt) of output current on the basis of the measured current samples and the time between points of change of the output voltage vectors.

15. The apparatus according to claim 13, wherein the control system calculates, on the basis of a measured rate of change of the current, the values of all output currents at a desired instant of time.

16. The apparatus according to claim 12, wherein the control system calculates a rate of change (di/dt) of the output current on the basis of measured samples and a time between the points of change of the output voltage vectors.

17. The apparatus according to claim 12, wherein the control system calculates, on the basis of a measured rate of change of the current, values of all output currents at a desired instant of time.

18. The apparatus according to claim 12, wherein the control system estimates the value of output currents on the basis of calculated instantaneous values at the midpoint of a zero vector.

19. The apparatus according to claim 12, wherein the current measuring sensor is a shunt resistor disposed in the intermediate circuit.

20. The apparatus according to claim 12, wherein the current measuring sensor is a converter based on the Hall effect, disposed in the intermediate voltage circuit.

* * * * *